(No Model.)
J. MELLEN & N. O. GOLDSMITH.
REVERSING MECHANISM FOR ELECTRIC MOTORS.
No. 528,440.  Patented Oct. 30, 1894.
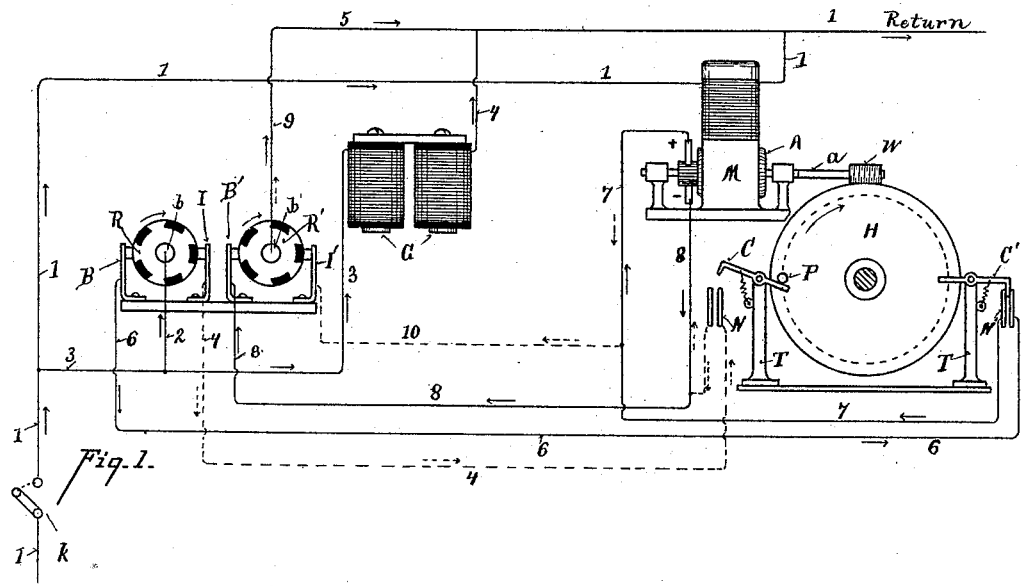
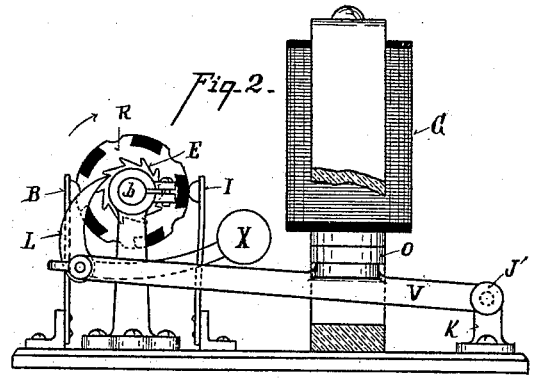
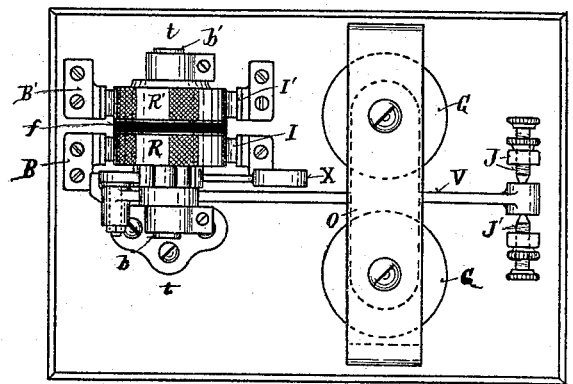
Attest:
C. W. Miles
Oliver Kaiser
Inventors:
Nathaniel O. Goldsmith & John Mellen
By Wood & Boyd, attys

UNITED STATES PATENT OFFICE.

JOHN MELLEN, OF NEWPORT, KENTUCKY, AND NATHANIEL O. GOLDSMITH, OF CINCINNATI, OHIO, ASSIGNORS TO FREDERIC C. WEIR, OF CINCINNATI, OHIO.

REVERSING MECHANISM FOR ELECTRIC MOTORS.

SPECIFICATION forming part of Letters Patent No. 528,440, dated October 30, 1894.

Application filed March 24, 1894. Serial No. 504,941. (No model.)

*To all whom it may concern:*

Be it known that we, JOHN MELLEN, residing at Newport, in the county of Campbell and State of Kentucky, and NATHANIEL O. GOLDSMITH, residing at Cincinnati, in the county of Hamilton and State of Ohio, citizens of the United States, have invented certain new and useful Improvements in Reversing Mechanism for Electric Motors, of which the following is a specification.

The object of our invention is to provide a reversing instrument for electric motors, so arranged that every time that the motor is connected in circuit with the main line the armature of the motor will revolve in one direction, and when the circuit is broken and the connection made the second time the armature of the motor will revolve in the reverse direction. We accomplish this by means of but two wires from the place of control to the reverser; and it is especially adapted to reverse motors at a distance from the place of control by the use of two wires instead of four wires, as is customary, and is also especially adapted to operate railway signals, railway switches, and other mechanism requiring to be moved alternately in opposite directions.

The various features of our invention are fully set forth in the description of the accompanying drawings making a part of this specification, in which—

Figure 1 is a diagram showing circuit connections of the reverser, motor, magnet and automatic motor cut out. Fig. 2 is an elevation partly in section of the reversing instrument. Fig. 3 is a top plan view of the same. Fig. 4 is a central vertical section through one of the reversers.

The method of reversing the motor herein shown for convenience of illustration is applied to the armature circuit for changing the direction of the flow of currents through the armature of the motor; the current through the field always flowing in the same direction.

It is obvious that the field wires and the armature wires could be transposed, and the reversers and cut-outs applied to the field wires in lieu of the armature wire, and accomplish the same results. Applying the cut-outs to the armature line is simply the preferred form.

M represents the motor.

A represents the motor armature; a, a shaft connected thereto on the end of which is mounted a worm gear W.

H represents a worm wheel on the periphery of which are worm teeth engaging with the worm W. The wheel H is the transmitter of the power from the motor, and the transmitting device may be a crank and pitman, or other well known instrumentalities.

1 represents the line wire, and 5 the return line wire.

$k$ represents a switch for making and breaking the main circuit. The current passes in the direction shown by the arrows.

3 represents a branch wire leading from wire 1 to one of the pair of magnets G, and 4 the return wire connected with wire 5.

It will be observed that the pair of magnets G is permanently in the main circuit, and the field magnet F of the motor is also shown in the main line circuit.

The reversing mechanism is operated by the power of magnets G, as shown in Figs. 2 and 3. It is constructed as follows:

V represents an armature lever pivoted by screws J J' to the bracket K. O represents a pair of armatures mounted on said lever. L represents a pawl pivoted to the forward end of said lever, engaging with the teeth of ratchet E, which journals upon the hub $b$ of the reverser R.

X represents a weight to cause the lever B to drop quickly when the magnet G is demagnetized by breaking the controlling circuit.

The circuit reversers R R' are each the counterpart of the other, and are constructed of two sections, united by screws S to the fiber or insulating material $f$. They are provided with hubs $b$, $b'$ and are revolved simultaneously on the common axis $t$, by the engagement of the pawl with the ratchet. The peripheries of these circuit breakers are shown as composed of five metallic segments, each separated from the other by insulating material.

B, I, represent spring terminals engaging with the periphery of the circuit reverser R, and B' I' spring terminals engaging with the periphery of the circuit reverser R'. The motor circuit is made alternately through one or the other of these reversers, as the case may be; and broken alternately by the circuit breakers C C', which are preferably operated by the worm wheel H.

In the diagram Fig. 1, the terminal B is shown in contact with one of the metallic segments of the reverser R. When in this position the line is established as follows: By wire 1, 3, 2, to hub $b$, thence by terminal B and wire 6 to contact point N' N'; thence by wire 7 to, say, the plus brush of the motor armature; thence by the minus brush of the armature through wire 8 to the terminal B' of the reverser R', through said reverser by wire 9 to the return wire 5. Now if the reversers R R' be each moved one step so that the spring terminal B is in contact with the insulated segment of the reverser, and the terminal I is in contact with the metal of said reverser, terminal B' will be cut out of connection with the reverser R', and terminal I' will be brought into metallic contact with the reverser R'. Then the circuit will be by wire 3 through wire 2, and by terminal I and wire 4, shown in dotted lines, through the terminals N, which are connected together by the contact of the cut outs C being dropped down between them; thence by wire 8 to the minus brush armature, thence by the wire plus brush, and the line 7, dotted line 10 to the terminal I'; thence by the hub $b'$ and wire 9 to the return wire 5.

It will thus be seen that the circuit for the motor is established either through lines 2 or 4, according to the position of the circuit reversers R R' on their common axes; and that this circuit breaker is moved step by step by the armature lever V of the magnet G whenever magnet G is energized; that is, each time the magnet is energized it raises the lever V and moves the circuit reversers R R' one step on their axes, and sends the current over one line through the armature of the motor. When the magnet is demagnetized, the armature drops and the moment it is energized again the reversers are moved one step and the circuit through the motor reversed; and these circuit reversers could be used to reverse the current through the motor without the use of the automatic cut-outs C C', which are employed for another purpose, as will be now explained.

In operating the motor M for such purposes as throwing a switch it is desired to cut-out the motor circuit automatically, whenever a full throw has been made, and it is for this purpose the terminals N N', and the circuit breakers C C' are employed. These circuit breakers C C' are mounted upon opposite sides of the wheel H on suitable stands. P represents a pin projecting from the disk of said wheel. The circuit breakers C are fixed upon oscillating levers which are pivoted to the standard T. The pin P is shown in engagement with the left-hand circuit breaker. When the motor is brought into circuit the wheel H is revolved in the direction of the arrow carrying the pin P around in its path, and the circuit is maintained through the motor until the pin P strikes the opposite lever on which is mounted the circuit breaker C'. It is raised from contact between the terminals N and the motor circuit is broken at that point, when the motor stops, and the revolution of the wheel H likewise ceases. It is sometimes desirable to apply a brake to arrest the revolution of the wheel at fixed points. So long as the magnet G is energized the reversers R R' will be held constantly in one position, and the wheel H cannot be turned back until the magnet G is de-energized, causing the armature lever V to drop. Then when the armature is again brought into circuit it will raise the lever V, move the circuit reversers R R' one step and establish a circuit through the armature of the motor in the opposite direction, which will reverse the movement of the wheel H; and this will be true even when both terminals N N' are connected by the circuit breakers C and C'. Thus, supposing the wheel H to be moved so that the pin P is passed half way from one circuit breaker to the other, and the main line is broken, the lever V will drop and as soon as the circuit is again established it will be raised and reverse the direction of the current through the motor, moving the wheel H back to the position shown in Fig. 1. If it is desired to move it forward, the main line must again be broken, the magnet G re-energized, reversing the direction of the current through the armature, when the wheel H will be moved forward in the direction shown by the arrow, and this is an important function in some cases; say when a device is employed to move a railway switch, and there is snow or ice, and it is clogged up. The operator by breaking the main circuit can stop the forward movement, move it back to its original position and reconnect the main line to move the switch forward again.

The object of the cut-outs and circuit breakers, is to automatically cut out the motor at any given point of the movement, and they will be employed or not depending upon the nature of the work to be performed.

Having described our invention, what we claim is—

1. In combination with an electric circuit, an electric motor connected in circuit therewith, a magnet connected in the main circuit, a pair of reversers connected in one of the motor circuits and having two alternate circuit terminals for said motor circuit, an armature mounted upon a power lever and operated by said magnet, and mechanism connecting the armature with the reverser, whereby the motor circuit is reversed by the breaking of the main circuit, substantially as specified.

2. In combination with a motor and its circuit connections with the main line, the reversers R R' adapted to revolve on their common axis, and having alternate peripheral contact and insulated segments, a pair of terminals engaging with each of said reversers, one of which is out of circuit when the other is in circuit, and mechanism for operating said reversers, substantially as described.

3. The combination with a main line circuit, and a reverser, of an electric motor having one of its circuit terminals connected to the main line, and two alternate circuits arranged through the reverser and having two sets of terminals connected in the opposite motor circuit, a magnet in the main line, and operating mechanism connected therewith, whereby the reverser is operated to reverse the circuit through the motor by the making and breaking of the main circuit, substantially as specified.

4. In combination with the reversers R R', the terminals B B' and I I', with two alternate circuits in connection with one of said motor circuits, mechanism in the main circuit for moving the reverser and bringing in one of said motor circuits as the other is cut out, substantially as described.

5. In combination with the reversers R R' and their terminals, and two alternate circuit connections with the motor, the cut outs c c' operated alternately by the transmitting mechanism of the motor to automatically cut out its circuit, substantially as described.

6. In combination with an electric motor having an armature and the field circuit, one of said circuits being formed alternately through the circuit reversers R R', and through alternate terminals B B' I I', and mechanism for operating the same by the magnet G in the main line, substantially as described.

7. The reversers R R' consisting of cylinders revolved on the common axis, the peripheries of which are composed of metallic segments and insulations, and two sets of terminals applied to the peripheries of said reversers, and so arranged that one pair of terminals is cut out when the opposite pair is cut in for reversing the circuit connections, substantially as specified.

8. In combination with an electric motor and its circuits, a reverser having two alternate circuit connections with one of the motor circuits a magnet connected in the main circuit, an armature operated by said magnet, and mechanism connecting said armature with the reverser, whereby the poles of the motor circuit are reversed each time the main circuit is made and broken, substantially as described.

9. The combination with an electric circuit, of a magnet connected in said circuit, an electric motor having one of its circuits through a reverser having alternate terminals, mechanism operated by said magnet for reversing said terminals, one or more cut-outs in the motor-circuit, and mechanism operated by said motor to automatically break the motor circuit at any predetermined time, substantially as specified.

10. The combination with an electric circuit, of a magnet connected in said circuit, an electric motor having one of its circuits connected through a reverser having alternate terminals, mechanism operated by said magnet for reversing said terminals, two alternate cut-outs, and mechanism for operating said cut-outs alternately by the reversal of the motor, substantially as specified.

In testimony whereof we have hereunto set our hands.

JOHN MELLEN.
NATHANIEL O. GOLDSMITH.

Witnesses:
T. SIMMONS,
WILL WOOD.